UNITED STATES PATENT OFFICE.

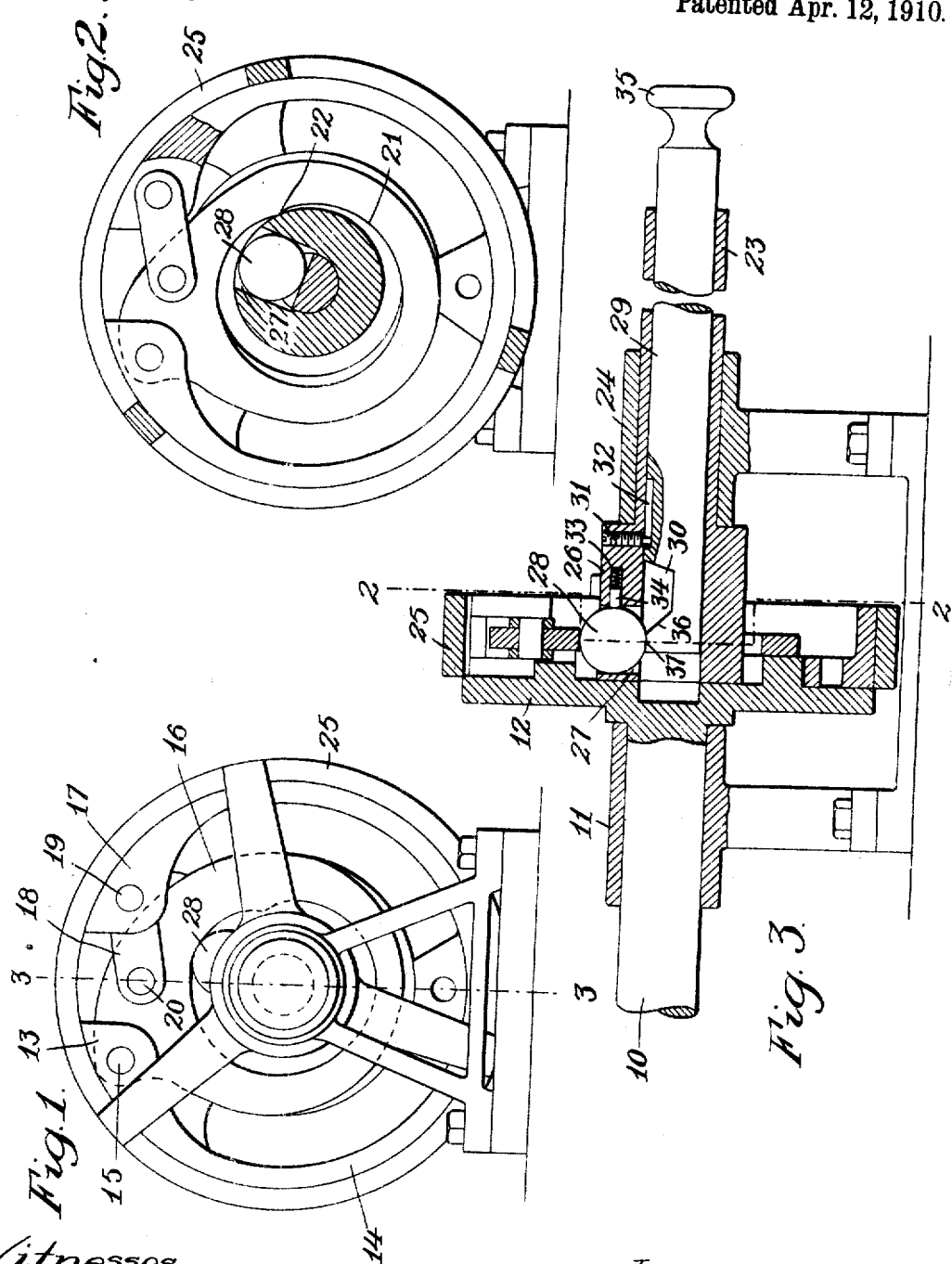

ALONZO W. WHITCOMB, OF WORCESTER, MASSACHUSETTS, ASSIGNOR TO WHITCOMB-BLAISDELL MACHINE TOOL COMPANY, OF WORCESTER, MASSACHUSETTS, A CORPORATION OF MASSACHUSETTS.

POWER-TRANSMITTING DEVICE.

954,661.  Specification of Letters Patent.  Patented Apr. 12, 1910.

Application filed June 29, 1909. Serial No. 505,047.

*To all whom it may concern:*

Be it known that I, ALONZO W. WHITCOMB, a citizen of the United States, residing at Worcester, in the county of Worcester, State of Massachusetts, have invented a certain new and useful Improvement in Power-Transmitting Devices, of which the following is a specification, reference being had therein to the accompanying drawings.

This invention relates to devices for the transmission of power, but more particularly to clutches, and is an improvement upon the device shown and described in U. S. Letters Patent, No. 893,684 of July 21, 1908. Clutches of this type have heretofore operated successfully on low or moderate speed mechanisms but, when driven at a high rate of speed, the action of centrifugal force caused sufficient movement of the working parts to bring the friction members into engagement. To overcome this difficulty, a clutch has been devised in which the parts operating the friction ring are so constructed and arranged that accidental expansion of this ring is impossible at any speed.

One feature is a lever for operating the friction ring, which is provided with means for overcoming the influence of centrifugal force. This is accomplished by extending the lever about the axis of rotation of the member upon which the lever is carried to balance masses.

A second feature is the means of connecting the lever to the friction ring, whereby a light pressure upon the extremity of the lever exerts a heavy pressure upon the friction ring.

Another feature is the means for operating the lever. This device is here shown as a ball resting in a cylindrical aperture or socket in the hub of the pulley or gear, and which is operated by a reciprocating rod sliding within the shaft upon which the pulley or gear is mounted. A cylinder or other form of body might be adopted instead of this ball, though the ball is preferable as it will not jam against the sides of the socket or aperture and prevent release of the clutch.

One embodiment of the invention is shown in the drawings in which:—

Figure 1 is an end view of the invention complete. Fig. 2, a section on line 2—2 of Fig. 3, the parts being in the unlocked position, as will be hereinafter described. Fig. 3, a section on line 3—3 of Fig. 1, the parts being in the locked position.

In the drawings, a driving shaft 10 is mounted in a bearing 11, and upon this shaft is fastened the disk wheel 12. This disk wheel might be replaced by a pulley wheel or gear if desired. To this disk wheel 12 is pivoted one extremity 13 of the friction ring 14 by means of the pivot pin 15, and upon this pin is also pivoted the lever 16. The other extremity 17 of the friction ring 14 is connected to the lever 16 by means of the link 18, one extremity of this link being pivoted upon the pin 19 and the other upon the pin 20. The inside surface 21 of the lever 16 is provided with an inwardly extending or locking portion 22.

The shaft 23 is provided with a bearing 24, this shaft preferably having the same axis as the shaft 10. Upon this shaft 23 is fastened the pulley wheel 25 provided with a hub 26. A gear might be used in place of this pulley wheel if desired. An aperture 27, preferably cylindrical, passes through the hub 26 and the shaft 24. In this aperture is seated a body 28, preferably spherical, which rests upon the reciprocating rod 29 within the shaft 23. This rod is provided with a notch 30 in which the spherical body drops when the rod 29 is pushed forward. This notch is provided with beveled sides for reasons which will be hereinafter stated. A set screw 31 passes through the hub 26 and the shaft 23 and enters a recess 32 in the rod 29 to limit the movement of this rod. In the hub and opening into the cylindrical aperture 27 is a recess 33 in which is a spring controlled pin 34 to prevent the spherical body 28 moving too freely in the aperture.

The rod 29 is here shown provided with a hand piece 35 by means of which it may be reciprocated within the shaft 23, though it should be clearly understood that any other suitable means of performing this might be adopted.

If desired, the disk wheel 12 may be counterweighted to offset the weight of the parts carried by the pivot pin 15.

The method of operation of the clutch is as follows:—The shaft 10 drives the wheel 12 which carries with it the friction ring and the lever with the parts connecting these two. Pull the rod 29 outward. The spherical body 28 slides upward on the beveled surface 36 of the notch 30, until this body rests on the flat portion 37 of the rod, and is in position shown in Fig. 1. As the disk wheel 12 revolves, the lever passes over the spherical body until the portion 22 of the former is reached when the latter comes in contact with it and swings the lever upward and to the right. The link 18 causes the friction ring to expand against the friction surface of the pulley wheel 25. This lever should preferably be so constructed that the spherical body 28 cannot pass beneath the inwardly extending or locking portion 22 when the clutch is in the locked position, and it is advisable to make this locking portion of sufficient size to take up the wear. It may be readily seen that an increase in the load on the pulley 25 causes a proportional increase in the pressure of the spherical body on the lever, and locks the friction parts more firmly together.

The lever 16, instead of encircling the axis of rotation of the disk wheel or other members upon which it is carried in the form of a ring, might be extended in any manner about this axis to balance masses and overcome the action of centrifugal force, and it might also be attached to the members of the clutch in any other suitable manner. The ring has an advantage over any other type of lever in that it absolutely prevents the escape of the ball or other body from the aperture.

It should be clearly understood that the clutch herein shown and described is capable of a great number of modifications without departing from the scope of the invention.

What I claim as my invention and desire to secure by Letters Patent is:—

1. In a device of the class described, the combination with a driving and a driven element, of a friction clutch, comprising a friction member carried by each of said elements, and means for securing said elements together, comprising a lever carried by one of said elements and adapted to operate one of the friction members, said lever being extended about the axis of rotation of the element upon which it is carried to balance masses and overcome the influence of centrifugal force, and a device carried by the other of said elements for operating said lever.

2. In a device of the class described, the combination with a driving and a driven element, of a friction clutch, comprising a friction member carried by each of said elements, and means for securing said elements together, comprising a lever pivotally mounted upon one of said elements and connected to one of the friction members, said lever being extended about the axis of rotation of the element upon which it is carried to balance masses and overcome the influence of centrifugal force, and a device carried by the other of said elements for operating said lever.

3. In a device of the class described, the combination with a driving and a driven element, of a friction clutch, comprising a friction member carried by each of said elements, and means for securing said elements together, comprising a lever pivotally connected to one of said elements and one of said friction members to form a toggle joint to operate this friction member, and means carried by the other of said elements for operating said lever.

4. In a device of the class described, the combination with a driving and a driven element, of a friction clutch, comprising a friction member carried by each of said elements, and means for securing said elements together, comprising means for operating one of said friction members, and a device for controlling said operating means comprising a spherical body seated in an aperture in one of said elements, and means for causing said body to be advanced to engage said operating means.

5. In a device of the class described, the combination with a driving and a driven element, of a friction clutch, comprising a friction member carried by each of said elements, and means for securing said elements together, comprising means carried by one of said elements for operating one of said friction members, and a device carried by the other element for controlling said operating means, comprising a body seated in an aperture in said other element, and means for causing said body to be advanced into engagement with said operating means.

6. In a device of the class described, the combination with a driving and a driven element, of a friction clutch, comprising a friction member carried by each of said elements, and means for securing said elements together, comprising means carried by one of said elements for operating one of said friction members, and a device carried by the other element for controlling said operating means, comprising a spherical body seated in an aperture in said other element, and means for causing said body to be advanced into engagement with said operating means.

7. In a device of the class described, the combination with a driving and a driven element, of a friction clutch, comprising a friction member carried by each of said elements, and means for securing said elements together, comprising means carried by one of said elements for operating one of said friction members, and a device carried by the other element for controlling said operating means, comprising a ball seated in a cylindrical aperture in said other element, and means for causing said ball to be advanced into and retained in engagement with said operating means.

8. In a device of the class described, the combination with a driving and a driven element, of a friction clutch, comprising a friction member carried by each of said elements, and means for securing said elements together, comprising means carried by one of said elements for operating one of said friction members, and a device carried by the other element for controlling said operating means, comprising a ball seated in a cylindrical aperture passing through the hub and shaft of said other element, and a reciprocating rod within this shaft provided with means for advancing said ball into and retaining it in engagement with said operating means.

In testimony whereof I affix my signature in presence of two witnesses.

ALONZO W. WHITCOMB.

Witnesses:
HARTLEY W. BARTLETT,
ALMA H. NEILSON.